United States Patent [19]

Heske, III

[11] Patent Number: 5,760,383
[45] Date of Patent: Jun. 2, 1998

[54] METHOD AND APPARATUS FOR SIMULATING BAR CODE

[75] Inventor: Theodore Heske, III, Suwanee, Ga.

[73] Assignee: NCR Corporation, Dayton, Ohio

[21] Appl. No.: 681,589

[22] Filed: Jul. 29, 1996

[51] Int. Cl.$^6$ ............................................. G06K 7/10
[52] U.S. Cl. .......................... 235/462; 235/438; 235/472
[58] Field of Search ................................ 235/462, 472, 235/437, 438

[56] References Cited

U.S. PATENT DOCUMENTS

| | | | |
|---|---|---|---|
| 4,736,096 | 4/1988 | Ushikubo | 235/472 |
| 4,879,540 | 11/1989 | Ushikubo | 235/472 |
| 4,990,756 | 2/1991 | Hoemann | 235/462 |
| 5,029,034 | 7/1991 | Weiley | 360/132 |
| 5,214,268 | 5/1993 | Doing | 235/462 |
| 5,258,605 | 11/1993 | Metlitsky et al. | 235/462 |
| 5,296,690 | 3/1994 | Chandler et al. | 235/462 |
| 5,420,943 | 5/1995 | Mak | 382/313 |
| 5,479,515 | 12/1995 | Longacre, Jr. | 380/54 |
| 5,484,994 | 1/1996 | Roustaei | 235/462 |

FOREIGN PATENT DOCUMENTS

| | | | |
|---|---|---|---|
| 2-280287 | 11/1990 | Japan | 235/462 |
| 4-256082 | 9/1992 | Japan | 235/462 |

*Primary Examiner*—F. L. Evans
*Attorney, Agent, or Firm*—Francis L. Conte

[57] ABSTRACT

A method and apparatus are provided for simulating a bar code. The bar code simulator includes a code emitter for generating a coded light beam which varies sequentially in intensity to correspond with bar code bars and spaces, and varies sequentially in duration to correspond with varying width of the bars and spaces. The flashing light beam so produced corresponds with the flashing back scattered light which would otherwise be produced by sweeping a scan beam across a bar code label. The independently produced coded beam simulates back scattered light which is identically detected by a scanner and decoded thereby.

17 Claims, 10 Drawing Sheets

MO - 0 RUN SINGLE
     1 RUN LOOP

M1 - 0 NO TRIGGER (IMMEDIATE TRIGGER)
     1 EXTERNAL TRIGGER

| STATE | $Q_0$ | $Q_1$ | $Q_2$ | $Q_3$ | |
|-------|-------|-------|-------|-------|----|
| S0    | 0 | 0 | 0 | 0 | 0  |
| S1    | 0 | 0 | 0 | 1 | 1  |
| S2    | 0 | 0 | 1 | 1 | 3  |
| S3    | 0 | 0 | 1 | 0 | 2  |
| S4    | 0 | 1 | 1 | 0 | 6  |
| S5    | 0 | 1 | 1 | 1 | 7  |
| S6    | 1 | 1 | 1 | 1 | 15 |
| S7    | 1 | 1 | 1 | 0 | 14 |
| S8    | 1 | 0 | 1 | 0 | 10 |
| S9    | 1 | 0 | 0 | 0 | 8  |
| S10   | 1 | 1 | 0 | 0 | 12 |
| S11   | 0 | 1 | 0 | 1 | 5  |
| S12   | 1 | 1 | 0 | 1 | 13 |
| S13   | 0 | 1 | 0 | 0 | 4  |
| S14   | 1 | 0 | 0 | 1 | 9  |
| S15   | 1 | 0 | 1 | 1 | 11 |

METHOD AND APPARATUS FOR SIMULATING BAR CODE

BACKGROUND OF THE INVENTION

The present invention relates generally to bar code scanners, and, more specifically, to testing thereof.

A typical bar code scanner includes a light emitter such as a laser for generating a laser beam which is propagated through a sweep generator which repetitively scans the beam along a scan line. A typical bar code such as the UPC, one-dimensional, bar code includes a series or sequence of bars and spaces of varying widths which represent suitable information in accordance with the conventional UPC symbology. For example, a unique identifying number representing the name of a consumer product and its price is encoded by the bar code and read by the scanner at a typical cash register terminal.

As the scan beam sweeps across the bar code, the dark bars absorb light and the light spaces reflect light which effects a sequence of back scattering light which varies in intensity at the speed of the sweeping beam. The scanner includes a conventional photodetector which detects the back scattered light from the bar code which is then suitably decoded in a conventional decoder for extracting the data represented by the bar code, such as product identification and price.

During the testing of bar code scanners in the working environment or during development of scanners, exemplary bar code labels may be manually positioned within the active scan volume of the scanner for being read by the scan beam. Hand scanning is inherently limited by the number of preprinted bar code labels on hand at any time, and by the significant time and effort required for each scan. Changes in bar code information require the generation of corresponding bar code labels which consumes time and is relatively expensive. It is therefore desirable to test bar code scanners without the need for using printed bar code labels.

SUMMARY OF THE INVENTION

A method and apparatus are provided for simulating a bar code. The bar code simulator includes a code emitter for generating a coded light beam which varies sequentially in intensity to correspond with bar code bars and spaces, and varies sequentially in duration to correspond with varying width of the bars and spaces. The flashing light beam so produced corresponds with the flashing back scattered light which would otherwise be produced by sweeping a scan beam across a bar code label. The independently produced coded beam simulates back scattered light which is identically detected by a scanner and decoded thereby.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
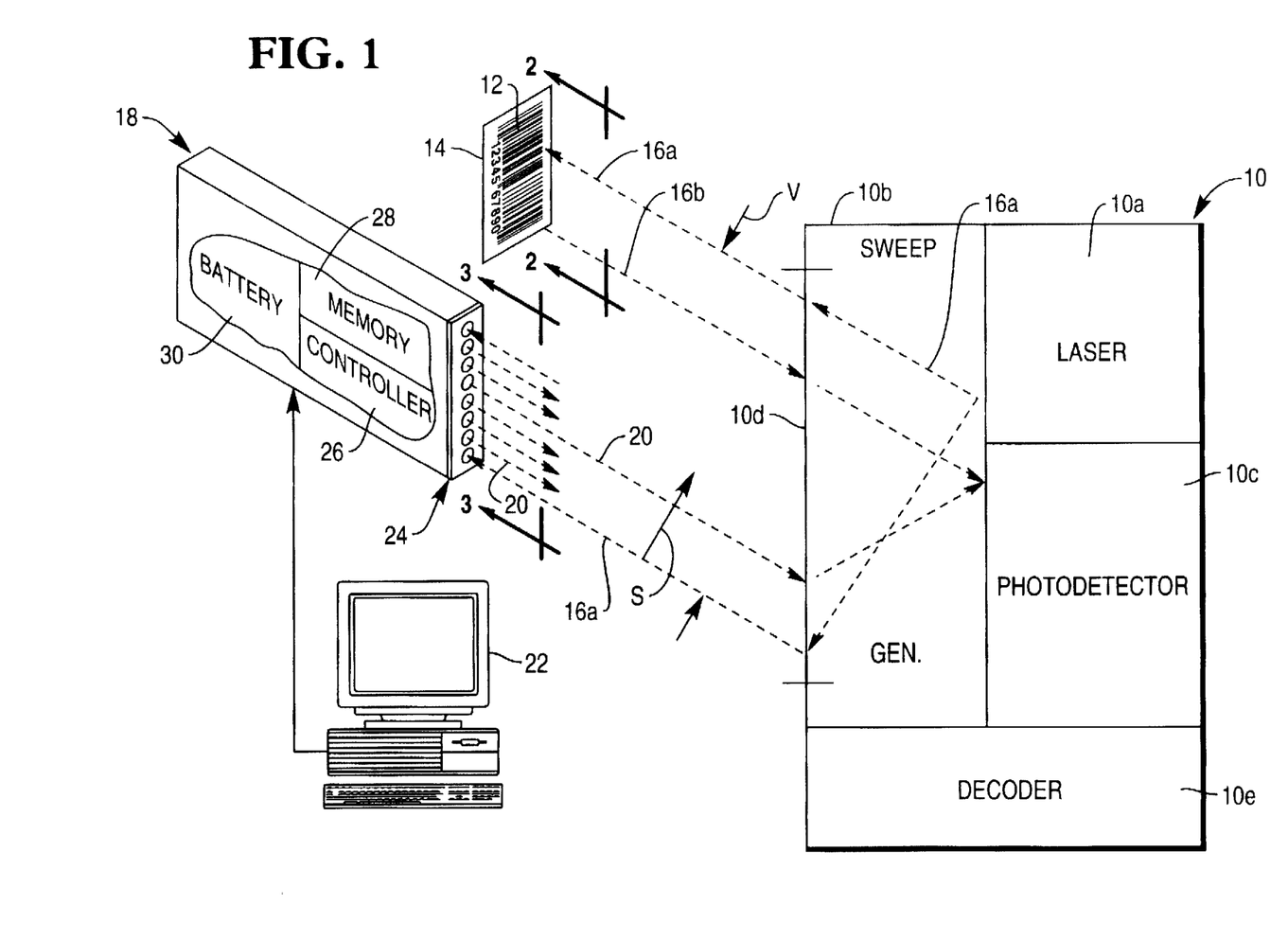
FIG. 1 is a schematic representation of a bar code simulator in accordance with an exemplary embodiment of the present invention for projecting a coded beam into a conventional bar code scanner for decoding in a manner similar to decoding of a conventional bar code label.

Illustrated schematically in FIG. 1 is a conventional bar code scanner 10 which may take any suitable configuration for optically scanning a conventional bar code 12 which may be printed on a corresponding label 14. In the exemplary embodiment illustrated in FIG. 1, the scanner 10 includes a light beam emitter 10a in the form of a conventional laser for producing a constant intensity laser scan beam 16a which is propagated through a conventional sweep generator 10b which periodically sweeps the scan beam 16a over an active scan volume V. The sweep generator 10b may take any suitable form such as a multi-faceted rotating mirror which periodically scans or sweeps the scan beam 16a along a scan line S. When the bar code label 14 is placed within the active scan volume V, the sweeping scan beam 16a projects the scan line S across the bar code 12. This is shown in more particularity in FIG. 2.

Figure 2:
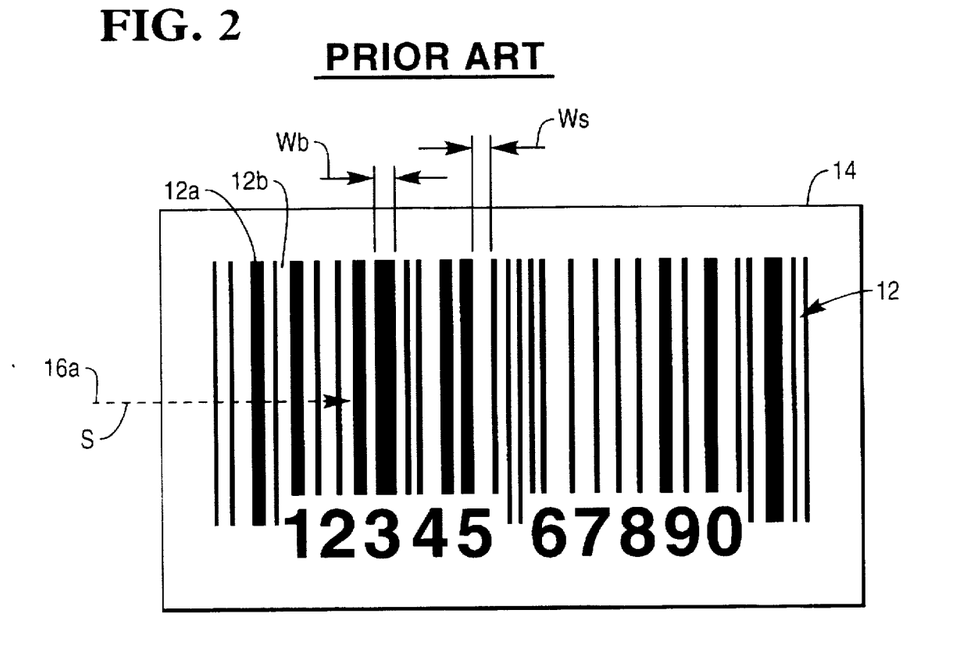
FIG. 2 is a plan view of the bar code label illustrated in FIG. 1, and taken along line 2—2, in an exemplary prior art configuration of a plurality of bars and spaces of varying width.

The exemplary bar code 12 illustrated in FIG. 2 includes a sequence or series of geometric bars 12a and spaces 12b of varying widths $W_b$ and $W_s$, respectively. The bar code 12 may take any conventional form such as the Universal Product Code (UPC) shown in FIG. 2, or the Code 128 symbology (not shown). Conventional bar code symbology determines the sequence and width requirements of the bars and spaces for encoding desired data within the bar code 12. The bar code 12 may be one-dimensional as illustrated or two-dimensional if desired. In either case, data is represented by the varying width of the bars and spaces.

The bars 12a are dark and generally absorb light, whereas the spaces 12b are light and generally reflect light. Accordingly, as the scan beam 16a illustrated in FIG. 1 traverses the bar code 12, back scattered light 16b is reflected from the bar code 12 in varying intensity corresponding to the bars and spaces 12a,b, and the duration of the back scattered light 16b corresponds with the sweeping speed or frequency of the scan beam 16a.

The scanner 10 therefore also includes a conventional code detector 10c in the form of a conventional photodetector for sensing or detecting the intensity of the back scattered light 16b. The scanner 10 typically has a common window 10d through which the scan beam 16a is projected from the scanner 10 and through which the back scattered light 16b is received and suitably optically channeled to the code detector 10c. The scanner 10 also includes a conventional decoder 10e in the exemplary form of a digitally programmable microprocessor which is operatively joined to the code detector 10c for decoding the back scattered light 16b into the data corresponding with the bar code 12.

The bar code scanner 10 illustrated in FIG. 1 is conventional in structure and function for suitably reading or decoding the data stored in the printed bar code label 14. However, if it is desired to test the scanner 10 with various bar codes 12, different bar code labels 14 must be printed and typically hand scanned within the active scan volume V of the scanner 10 for reading by the scanner 10.

In accordance with the present invention, preprinted bar code labels 14 are eliminated, and instead a bar code simulator 18 as shown in FIG. 1 is provided for simulating the bar code 12 optically for conventional detection by the code detector 10c of the bar code scanner 10. The simulator 18 is effective for directly generating independently or remotely of the scanner 10 a flashing or coded light beam 20 which corresponds with the back scattered light 16b from the printed bar code 12 for detection by the code detector 10c and decoding in the conventional manner.

The coded light beam 20 varies sequentially in light intensity to correspond with the bar code bars 12a and spaces 12b illustrated in FIG. 2, and varies sequentially in time duration to correspond with the varying width $W_b$, $W_s$ of the bars and spaces. Since the back scattered light 16b varies in intensity corresponding with the bars and spaces, and varies in duration corresponding with the respective widths of the bars and spaces and frequency of beam scanning, the coded beam 20 may be electrically produced to identically match this light waveform pattern. And, the waveform may be easily varied to simulate any variation in bar code desired. In this way, any type of bar code may be simulated to contain any desired data by simply changing the flashing pattern of the coded beam 20 since the scanner 10 cannot discern the difference between actual back scattered light 16b or the coded beam 20 simulated therefor.

The simulator 18 is suitably configured to simulate any desired bar code by firstly selecting the desired bar code symbology from which the rules for generating the bar code simulation are applied. In the exemplary UPC bar code 12 illustrated in FIG. 2, the bars 12a and spaces 12b effect either little or no light back scattering for the former, and maximum light back scattering for the latter. The code detector 10c illustrated in FIG. 1 therefore associates low level back scattered light 16b with a bar 12a, and high level back scattered light 16b with a space 12b. And, since the scan beam 16a is scanned at a constant and known frequency, the relative time duration of the bars and spaces 12a,b corresponding to their varying widths is also detectable. These basic rules apply for any type of symbology which uses bars and spaces, and varying widths thereof, for encoding desired data for subsequent decoding by a scanner.

Since the scan beam 16a sweeps across the bar code 12 illustrated in FIG. 2 along a scan line, the various bars and spaces are sequentially illuminated for time durations corresponding with their respective widths. And, the light back scattered therefrom corresponds sequentially therewith. Accordingly, the bar code 12 illustrated in FIG. 2 may be simulated in accordance with the invention by providing a signature thereof which includes the sequence of alternating intensity between minimum and maximum intensity corresponding with the bar code bars 12a and spaces 12b, respectively. And, this occurs with the respective varying light intensity having time durations corresponding with the varying widths of the bars and spaces 12a,b corresponding with a specific scanning frequency of a specific bar code scanner 10.

In a typical symbology such as UPC, the narrowest width bar 12a is a unit or module wide, and the narrowest space 12b is also a unit or module wide. The maximum data rate is related to the time required to scan the combination of the smallest bar element adjacent to the smallest space element allowed in the chosen symbology. Thus the maximum data rate for the UPC symbology is related to the inverse of two module widths. For example, for achieving a maximum data rate of 1.0 MHz, a single module corresponds to 500 ns in time duration. This is obtained by taking one half the inverse of the desired maximum data rate.

By generating a reference or clock signal in the simulator 18, a preselected, constant clock frequency and period may be obtained which can be used for effecting the required bar code signature in varying intensity and duration. In a simple example, the desired clock period may be selected to correspond with the narrowest required bar code bar or space duration. However, it is desired that each of the maximum and minimum light intensities of the coded beam 20 occur over multiple, whole clock periods so that even the smallest required time duration corresponding with the narrowest bars and spaces requires multiple clock periods. In this way not only can the narrowest bars and spaces be accurately reproduced by corresponding intensity of light therefor, but the widths of each simulated bar and space may be varied if desired in small increments for adjusting the tolerance thereof. This may be used to test the ability of the scanner 10 to read bar codes wherein the elements thereof vary in printing tolerance.

In the example presented above for the 500 ns duration unit module, a multiple whole number of clock periods would be used therefor. Assuming a clock frequency of 50 MHz, which has a clock period of 20 ns, a count of 25 clock periods corresponds with the 500 ns interval module, which is obtained by dividing the 500 ns module by the clock period 20 ns. Accordingly, a one module wide bar or space requires 25 clock periods, a two module width requires 50 clock periods, a three module width requires 75 clock periods, etc.

A desired signature for any bar code may then be developed by providing a sequence of the required time durations expressed in clock periods, for example, for the alternating bars and spaces. The intensity of the coded beam 20 correspondingly has a minimum intensity to simulate the bars 12a and maximum intensity to simulate the spaces 12b, each of which having the required duration for the corresponding number of clock periods. By aiming or projecting the coded beam 20 into the code detector 10c for sensing thereby, the code detector 10c receives a light waveform analogous to that which it would have received from the corresponding back scattered light 16b, which can then be conventionally decoded in the decoder 10e. The coded beam 20 varies sequentially in duration to correspond with duration of the scan beam which would otherwise sweep across the bars and spaces of the printed label 14 in optical simulation thereof, without the need for the printed bar code label 14 itself.

Referring again to FIG. 1, any desired bar code signature may be created utilizing suitable software therefor in a conventional personal computer (PC) 22, for example. For any given bar code symbology, the required sequence of alternating intensity light with corresponding varying widths expressed in time duration may be obtained. For a given clock frequency of 50 MHz, for example, the bar code signature is a simple sequence of intervals of a whole number of clock periods representing the unit or module time interval, with the corresponding bars and spaces being multiples thereof like 175, 25, 25, 25 ...., for example. Each interval corresponds with an alternating bar or space in accordance with the chosen symbology. In the simplest embodiment, the sequence of intervals is executed by alternately energizing or deactivating a suitable light source either on or off. In other embodiments, the light source may be actuated between varying intensities greater than zero.

As shown in FIG. 1, the simulator 18 includes suitable means in the form of a code emitter 24 for generating the coded light beam 20. The code emitter 24 is operatively joined to a suitable controller 26, which may be in the form of a dedicated microprocessor, for varying the coded beam 20 sequentially in intensity to correspond with the bar code bars and spaces, and sequentially in duration to correspond with the varying width of the bars and spaces as represented by the corresponding time intervals or duration.

The simulator 18 includes a suitable memory 28 in the exemplary form of a conventional static RAM (SRAM) 28 which is operatively joined to the controller 26 for initially storing the bar code signature for processing by the controller 26 to flash the code emitter 24 for generating the coded beam 20 corresponding with the bar code signature. The simulator 18 may be a portable device, and may therefore include its own power supply in the form of a battery 30 for being self powered. The simulator 18 may be temporarily operatively connected to the PC 22 for downloading into the memory 28 any desired bar code signature for correspondingly flashing the code emitter 24 for generating the bar code simulating coded beam 20 for detection by the code detector 10c of the scanner 10. The simulator 18 may communicate with the PC 22 through the conventional parallel port thereof, for example.

Figure 3:
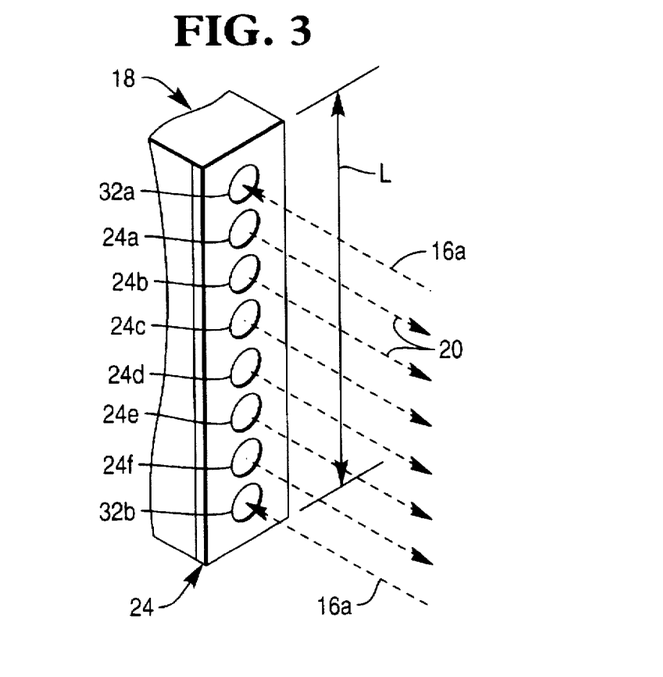
FIG. 3 is an end view of an exemplary embodiment of the code emitter illustrated in FIG. 1 and taken along line 3—3.

FIG. 3 illustrates in more particularity an exemplary embodiment of the code emitter 24 which preferably includes a plurality of conventional light emitting diodes (LEDs) designated 24a-f which are operatively joined to the controller 26 for simultaneously flashing the coded beam 20. Although a single code emitter 24 may be used, it is desirable to have a plurality of the code emitters 24a-f preferably colinearly aligned with each other for extending the range of detection within the optical viewing cone of the code detector 10c. The code detector 10c need only receive the coded beam 20 from one of the code emitters 24, and multiple code emitters 24 increase the likelihood thereof and reduce the need for accurately positioning the simulator 18 adjacent to the scanner 10.

The code emitters 24 are selected for emitting light at a suitable frequency or wavelength analogous to that of the beam emitter 10a for being detected by the code detector 10c. In an alternate embodiment, the code emitters 24 may be configured for emitting the coded beam 20 at different wavelengths so that the same simulator 18 may be used for different scanners 10 having different light wavelengths. As long as one of the code emitters 24 matches the wavelength specification of the code detector 10c, then the coded beam 20 may be detected thereby. The code emitters 24 may take any other configuration including parallel banks of LEDs if desired.

Figure 4A:
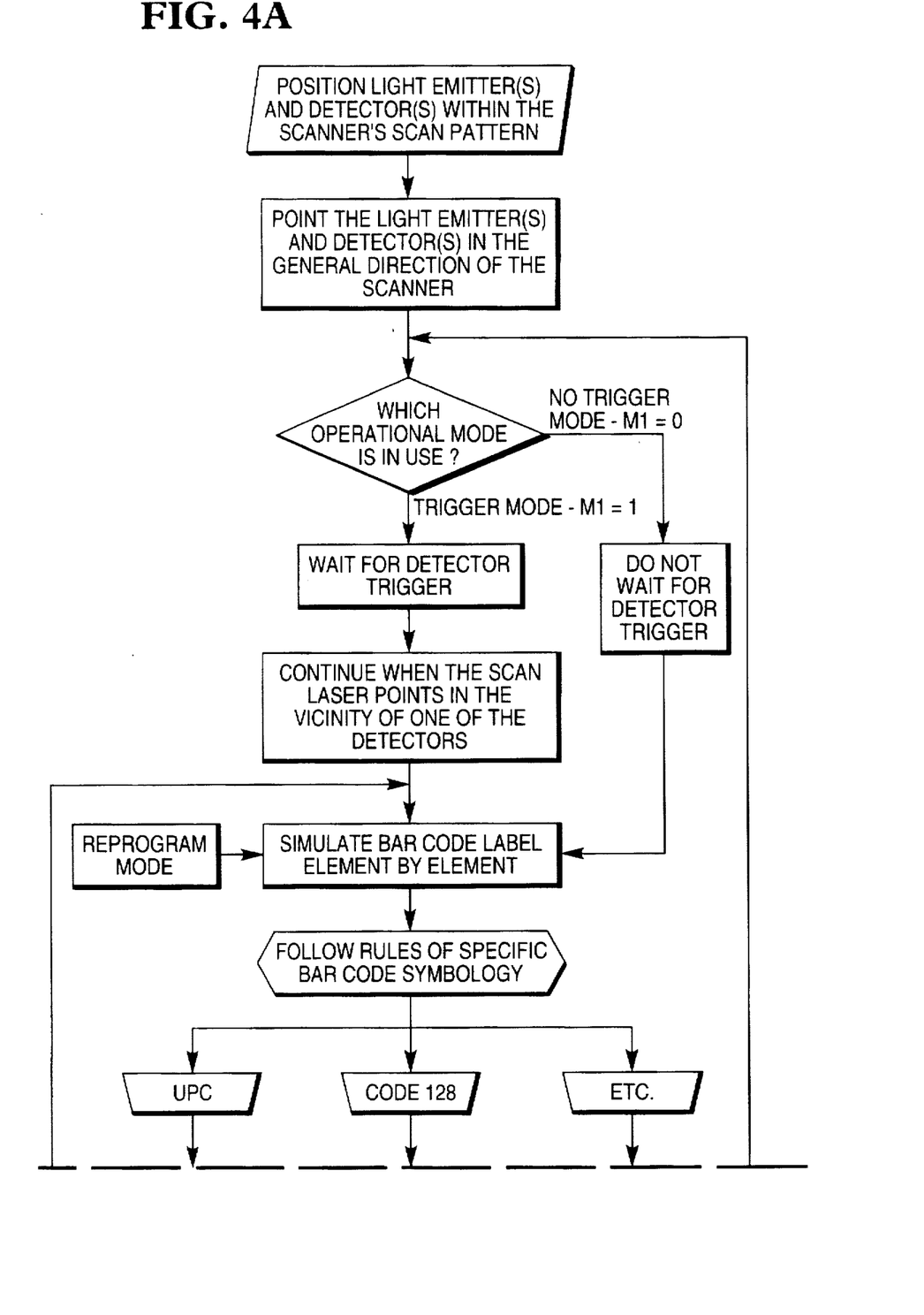
FIGS. 4A–B collectively are a flowchart representation of an exemplary method of simulating a bar code in accordance with the present invention for generating a flashing coded beam.
Figure 4B:
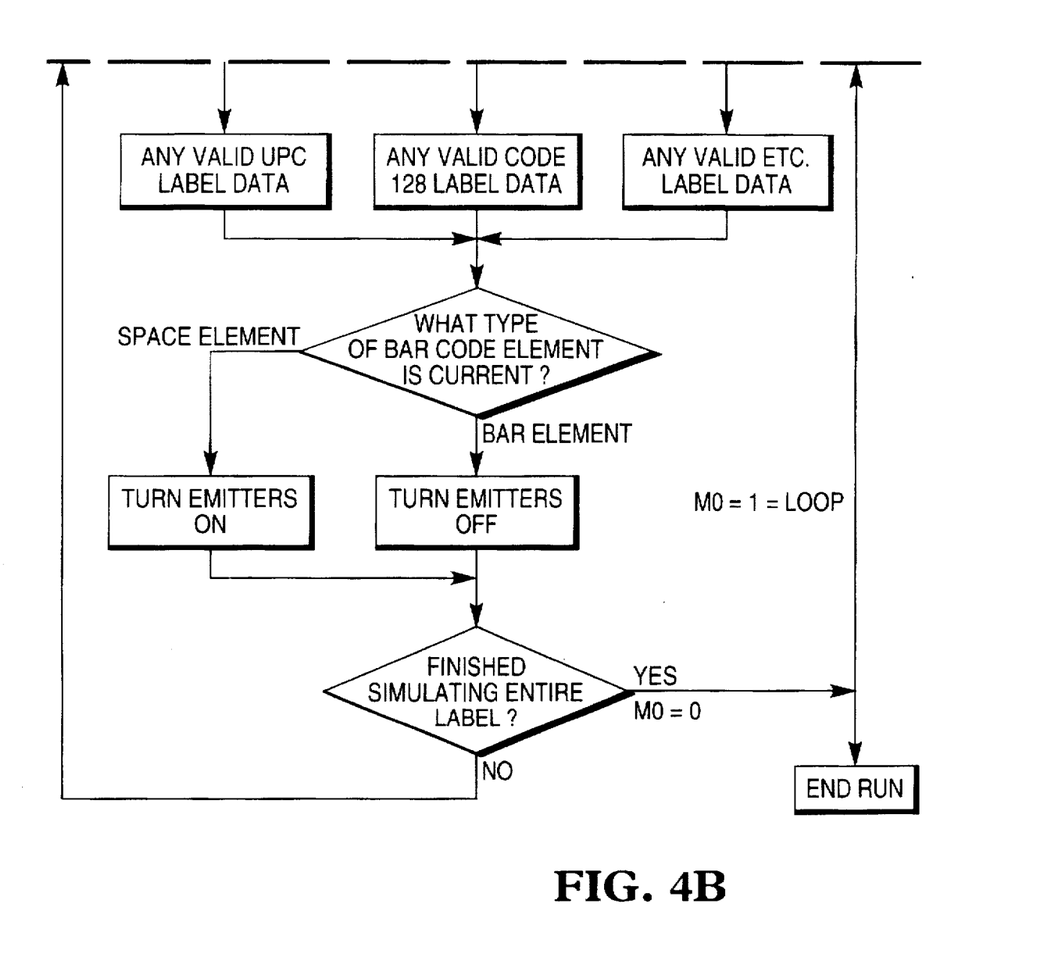

FIGS. 4A-B illustrate an exemplary flowchart of the operation of the simulator 18. After any desired bar code signature is downloaded from the PC 22 into the simulator 18, the simulator may be suitably positioned for pointing the code emitter 24 in the direction of the scanner 10. The simulator 18 may be operated in a trigger mode (M1=1) which requires a trigger signal to initiate flashing of the code emitter 24 in the desired sequence, or in a no trigger mode (M1=0) in which flashing is actuated without waiting for the trigger.

As shown in FIG. 3, a pair of trigger photodetectors 32a,b are disposed adjacent to the code emitters 24a-f for optically detecting the scan beam 16a from the scanner 10. The trigger detectors 32a,b preferably bound the code emitters 24a-f on opposite sides thereof for triggering the code emitters 24 upon detecting the scan beam 16a from either of opposite sides thereof. In the preferred embodiment illustrated in FIG. 3, the trigger detectors 32a,b are colinearly aligned with the code emitters 24a-f and may have a collective length L. In this way, if the scan beam 16a traverses the simulator 18 from the top or the bottom as shown in FIG. 3, one of the trigger detectors 32a,b will be correspondingly triggered. The trigger detectors 32a,b are operatively joined to the controller 26 for executing the bar code signature to flash the emitters 24 upon detection of scan beam 16a.

As indicated in FIGS. 4A-B, the code emitter 24 is suitably pointed toward the code detector 10c of the scanner 10 in use. The simulator 18 may be operated in its trigger mode wherein the control parameter M1 is preset to 1, or without the trigger mode with the trigger parameter M1 being set to 0. Without the trigger mode, the bar code simulation proceeds element by element in accordance with the sequence of the bar code signature stored in the memory 28. Or, execution of the signature in the trigger mode awaits detection of the scan beam 16a by either one of the trigger detectors 32a,b.

As indicated above, any type of bar code symbology such as the conventional UPC or Code 128 may be simulated. And, any valid bar code data may be represented by the bar codes themselves and provided in the bar code signature stored in the memory 28 with the sequence of required clock periods for alternately flashing the code emitters 24 on and off in simulation of the back scattered light from the corresponding, actual printed bar code found on an analogous label 14. For the bar elements, the code emitters 24 are preferably turned off, and for the space elements, the code emitters 24 are turned on. The sequence is executed in a single run until completed, which corresponds with a single pass of the scan beam 16a across an analogous printed bar code 12 on the label 14.

An additional loop parameter M0 may be set to 0 for allowing the bar code signature to be executed only once, or may be set to 1 for running in a loop mode to repeat execution of the signature for as many loops as desired.

Execution of the bar code signature may be accomplished in various manners for alternately flashing the code emitters 24 on and off with the proper interval durations corresponding to the spaces and bars, respectively. However, for high data rates and clock frequencies on the order of megahertz, it is desired to implement signature execution with relatively inexpensive electronics.

Figure 5:
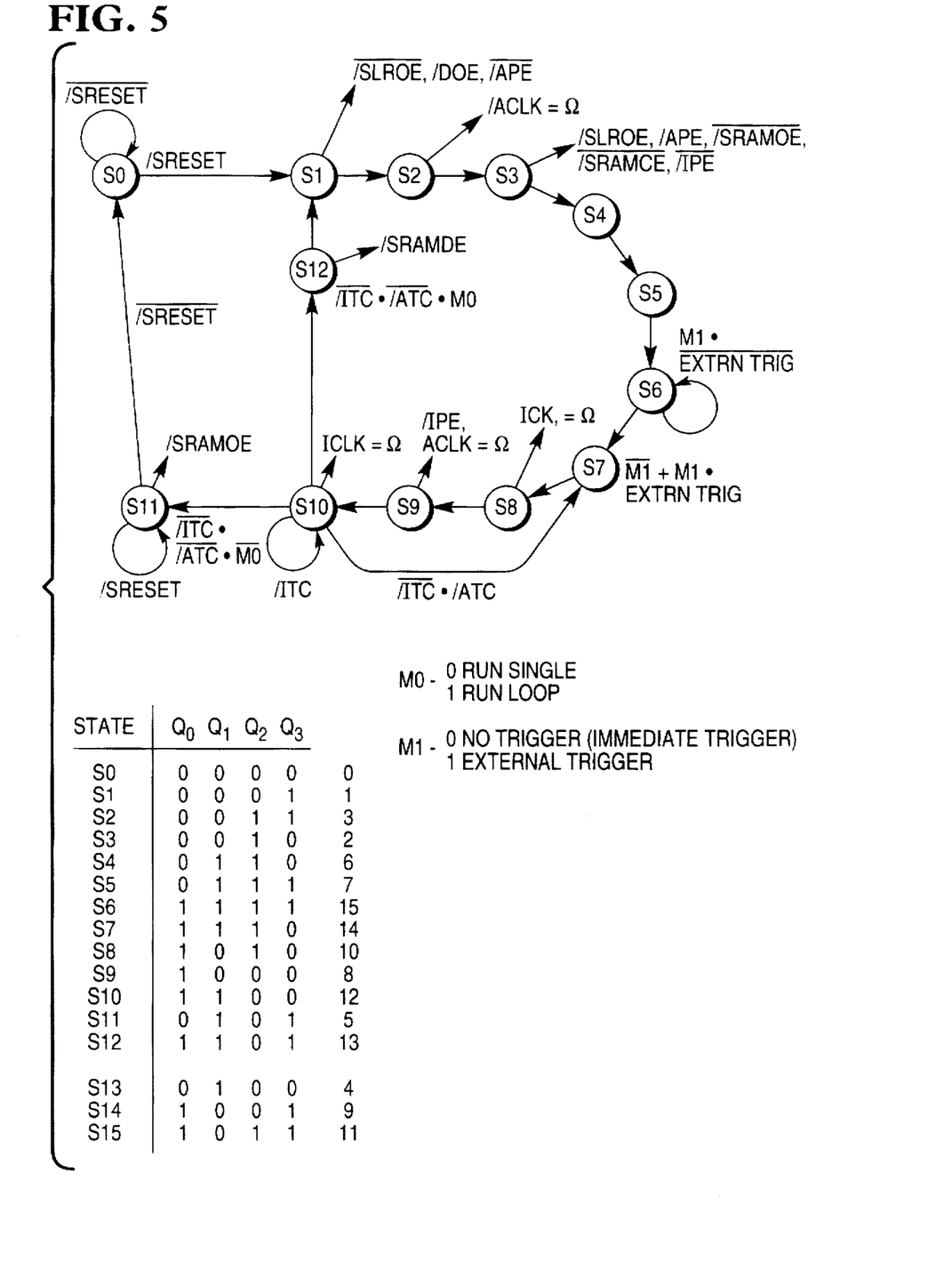
FIG. 5 is a schematic representation of a state machine for controlling timing of the code emitter illustrated in FIG. 3 in accordance with an exemplary embodiment of the present invention.

FIG. 5 illustrates schematically an exemplary state machine 34 which is preferably implemented in programmable digital logic for executing the bar code signature in a single run (M0=0) or in a loop of a plurality of runs (M0=1) for correspondingly flashing the code emitters 24. State machines are conventionally known in general, with the specific state machine 34 illustrated in FIG. 5 being configured specifically for executing the bar code signature in the required sequence of intervals and is suitably implemented in the controller 26.

Figure 6A:
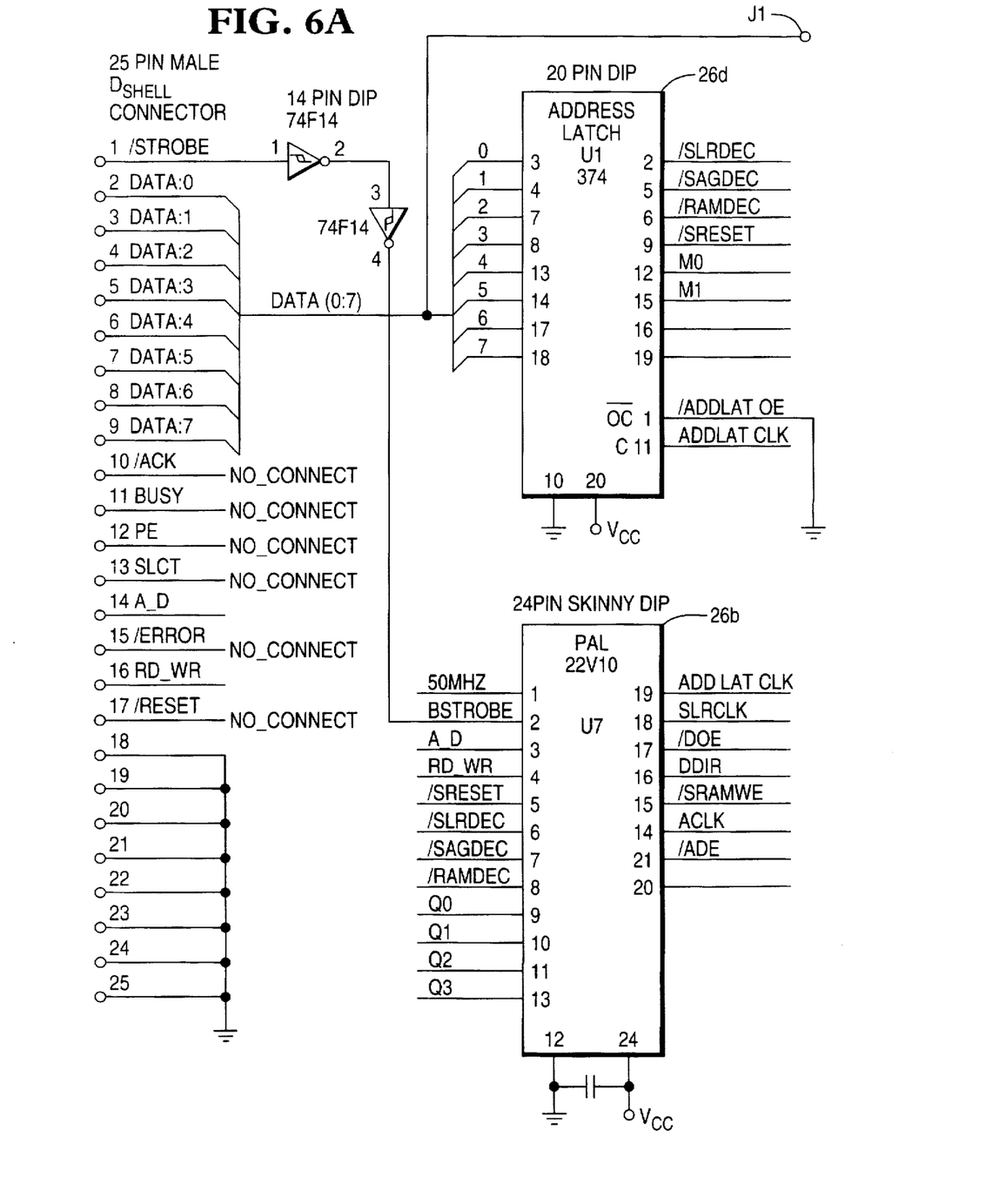
FIGS. 6A–G are a schematic circuit diagram of a controller and the state machine of FIG. 5 for use in the bar code scanner of FIG. 1 for flashing the code emitter for simulating a bar code in accordance with a preferred embodiment of the present invention.
Figure 6B:
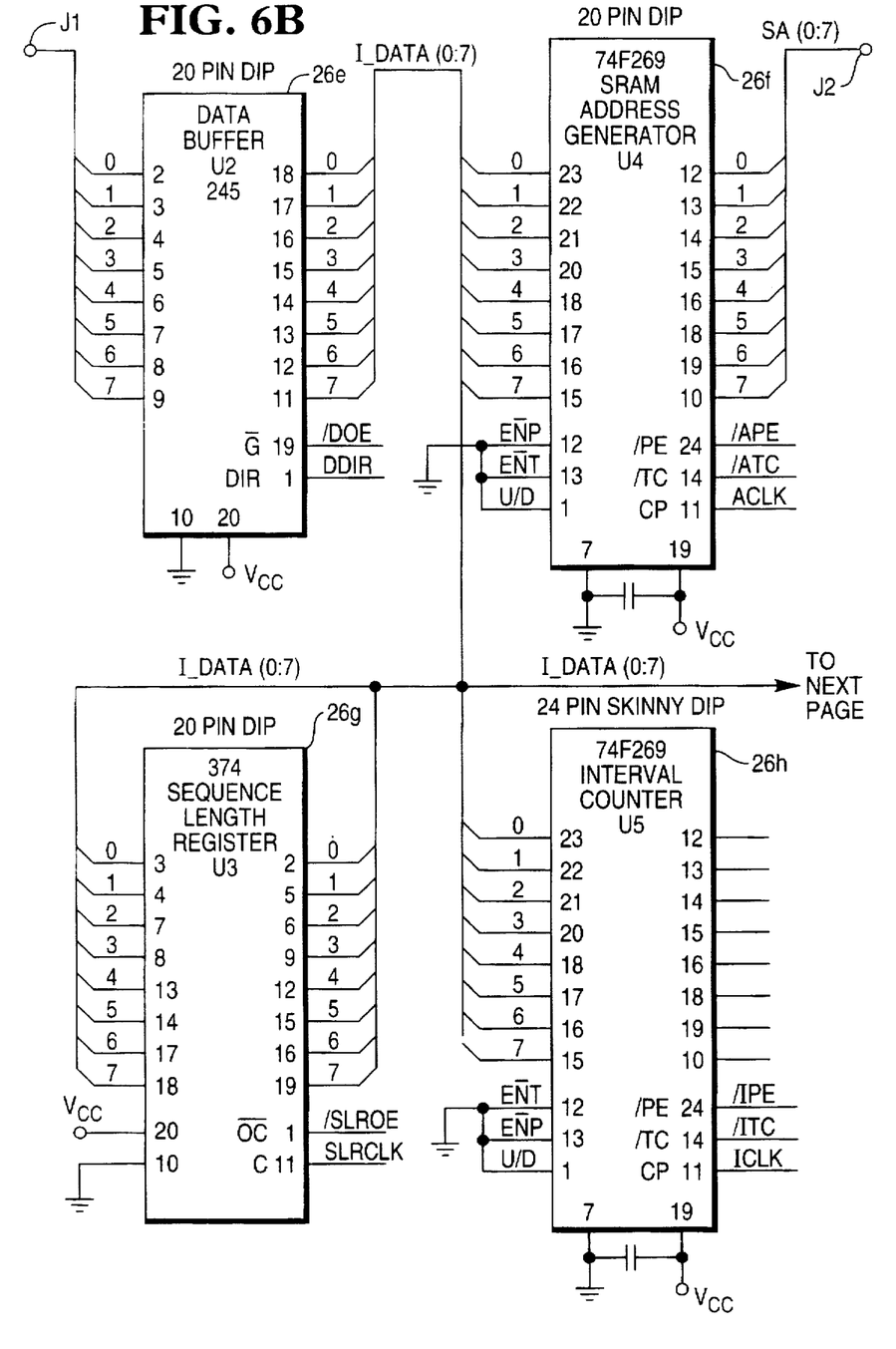
Figure 6C:
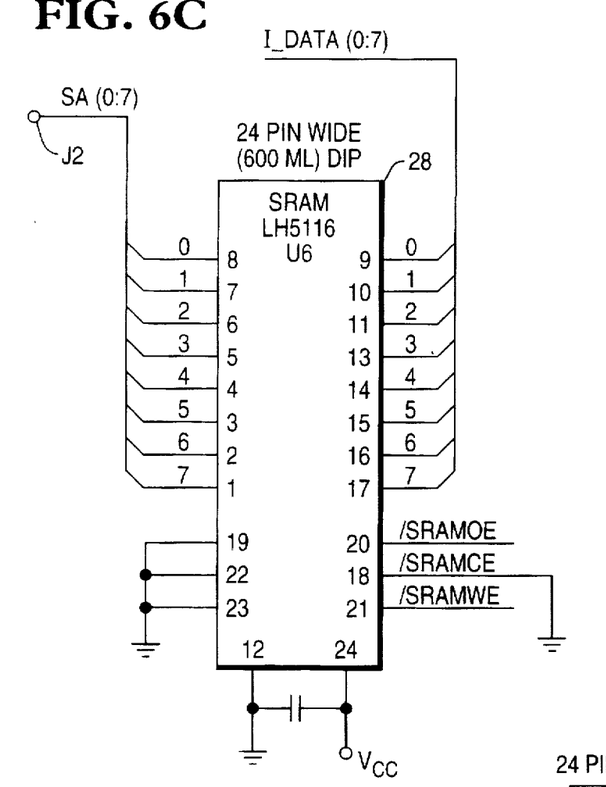
Figure 6D:
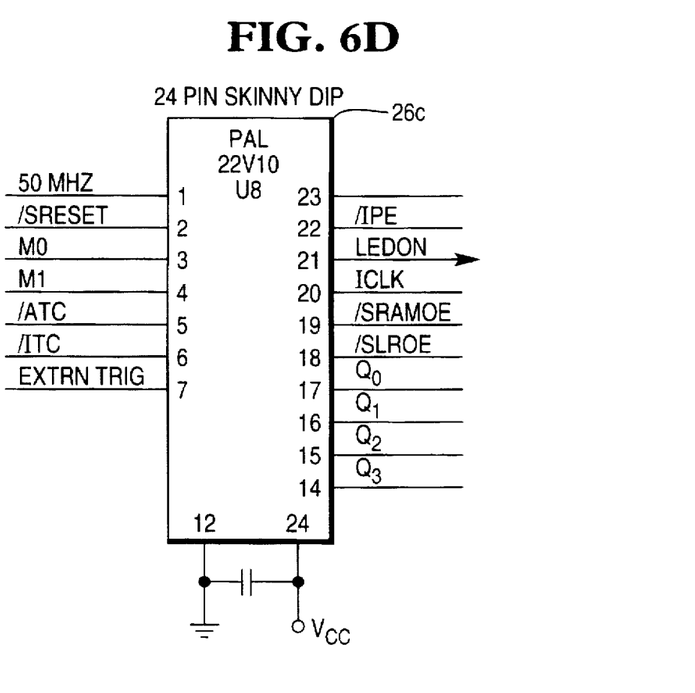

One embodiment of configuring the controller 26 and implementing the state machine 34 is illustrated in the exemplary circuit schematic shown in FIGS. 6A-G. The controller 26 preferably includes a conventional oscillator 26a illustrated in FIG. 6F which has a relatively high clock frequency of 50 MHz and corresponding clock period of 20 ns. The 50 MHz clock frequency is provided as input to a pair of identical programmable array logic chips 26b and 26c as shown in FIGS. 6A and 6D, respectively. The two chips 26b,c, however, are differently configured for collectively defining the state machine 34 illustrated in FIG. 5.

In FIG. 6A, a conventional address latch chip 26d is suitably operatively joined to the logic chip 26b, and is also operatively connected to a conventional data buffer chip 26e as shown in FIG. 6B. The data buffer 26e is in turn operatively connected to a conventional SRAM address generator chip 26f, and also operatively joined to a conventional sequence length register chip 26g, and a conventional interval counter chip 26h. The address generator 26f is in turn operatively joined to a conventional SRAM chip which defines the memory 28.

Figure 6E:
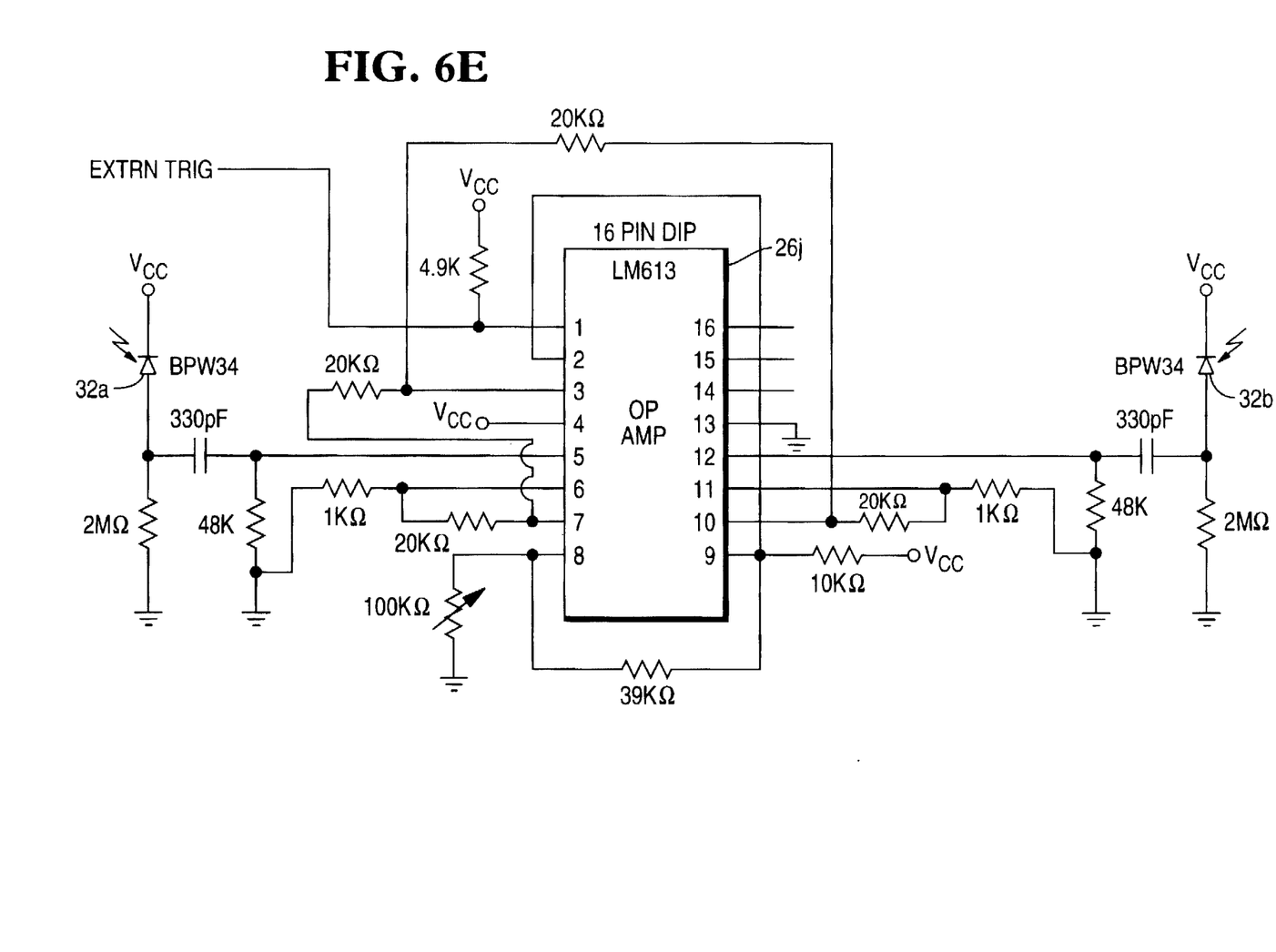
Figure 6F:
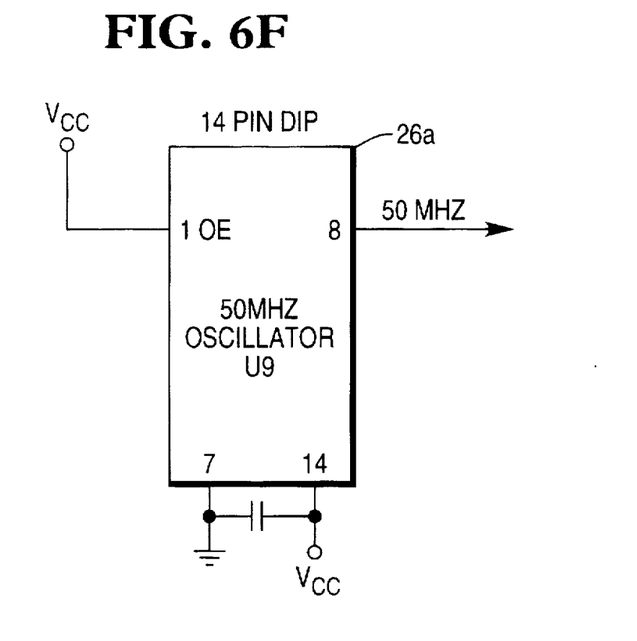

As shown in FIG. 6E, the pair of trigger detectors 32a,b are operatively joined to a conventional integrated op-amp 26j for providing the external trigger (Extrn Trig) for use in the trigger mode (M1=1).

The various chips are interconnected as shown by their terminal leads for implementing the state machine and executing the bar code signatures stored in the SRAM memory chip 28. As indicated above, the bar code signature includes a plurality of sequential intervals representing duration of the maximum and minimum alternating intensity of the coded beam 20 emitted from the code emitter 24. The memory 28 conventionally includes a plurality of address locations, or simply addresses, in which a respective one of the signature intervals is stored. The interval counter 26h illustrated in FIG. 6B defines a common count-down circuit.

In operation, the data loaded into each address location in the SRAM 28 represents the duration of a single interval. Each interval, in turn, is loaded into the count-down circuit 26h. The count-down circuit decrements its count for each clock tick. Accordingly, the total duration of an individual interval is determined by the initial value loaded into the interval counter 26h and the period of the clock (oscillator 26a). The state machine toggles the state of the code emitter 24 when the interval down-counter reaches zero. And, correspondingly, the next interval from the SRAM 28 is loaded into the interval counter 26h at this time.

Figure 6G:
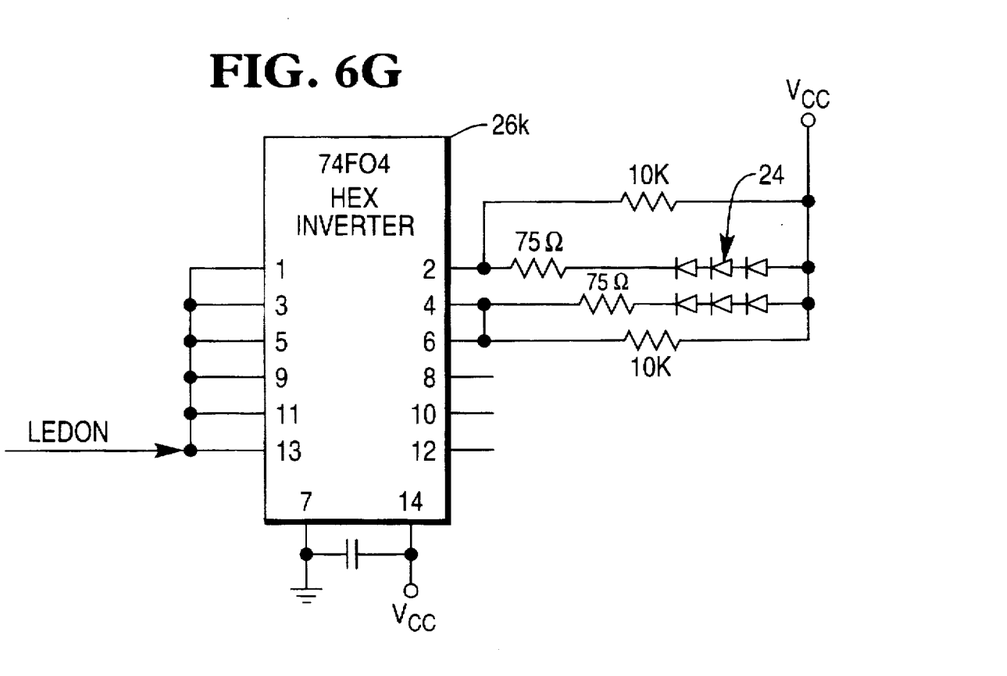

The logic chip 26c illustrated in FIG. 6D includes an output signal LEDON for actuating the LEDs of the code emitter 24 in the on state. The logic chip 26c is operatively joined to a conventional Hex inverter chip 26k as illustrated in FIG. 6G for providing the LEDON signal thereto. The six LED code emitters 24 (a-f) are shown in FIG. 6G operatively joined to the Hex inverter 26k. The controller 26, including the state machine 34, is therefore effective for executing the bar code signature stored in the SRAM 28 by sequentially loading the signature intervals from the memory addresses into the countdown circuit 26h, and toggles the code emitter 24 between the maximum on and minimum off beam intensities each time the count down circuit reaches zero until the entire sequence is executed.

The exemplary controller 26 illustrated in FIGS. 6A–G provides a substantially high maximum data rate in the megahertz frequency range, and with a substantially higher clock frequency so that small variations in the printing tolerances of the bar code 12 may be readily simulated. The adjustable coded beam 20 transmitted to the scanner 10 tests its ability to recognize bar codes 12 with variations therein which do not comply with specification optimum values.

For example, the effective width of the bars 12a and spaces 12b may be suitably varied by varying the defined interval count therefor for examining the corresponding effect in the scanner 10 itself. For excessive variation in widths of the bars and spaces, the scanner 10 will no longer recognize the bar code as complying with the specific symbology.

The bar code simulator 18 therefore provides a convenient and quick apparatus for rapidly presenting different bar code simulations to the scanner 10 for testing thereof. The entire testing procedure may be suitably and automatically controlled by the PC 22 which may be conventionally programmed to provide any desired series of different bar code simulations in the simulator 18 for projection into the bar code scanner 10.

The bar code simulator 18 provides a new apparatus for communicating with the bar code scanner 10 through the flashing code emitter 24 remotely from and independently from the scanner 10 itself. The simulator 18 does not rely on the scan beam 16a for producing the coded beam 20, although the scan beam 16a may be used merely for triggering execution of the bar code signature for flashing the emitters 24. The coded beam 20 is therefore independently generated in the simulator 18 to simulate the back scattered light 16b, with the scanner 10 being unable to detect the difference therebetween.

The bar code simulator 18 provides a non-invasive method to simulate any bar code symbology without requiring any changes to the bar code scanner 10 itself. This method of communicating with the scanner 10 uses a simple modulated stream of light pulses. The simulator 18 incorporates computer control within its own controller 26 as well as in the PC 22 so that highly automated operation may be effected to significantly save time while allowing a vast collection of symbols and symbol types to be simulated. Marginal and pathological symbols may also be simulated if desired. Further enhancing the symbol simulation capability of the simulator 18, the simulated symbols may be generated with a wide and programmable range of data rates.

Furthermore, the generic communication capability of the simulator 18 using the coded beam 20 may be used for providing in-situ reprogramming of the scanner 10 if desired for enhancing serviceability of scanner products. More specifically, the scanner 10 may be suitably modified in configuration for operating in a reprogramming mode for changing its operation as desired and as controlled by suitable software therein. Since reprogramming steps are merely one form of data, that data may be generated in the PC 22 and downloaded into the memory 28 of the simulator 18 for transmittal to the scanner 10 in the form of the coded beam 20. The data may be transmitted using any suitable bar code symbology for representing the data characters, or a specific symbology may be generated specifically for communication in the reprogramming mode. The decoder 10e conventionally decodes the coded beam 20, with the data therefrom being suitably directed to the controlling software of the scanner 10 for reprogramming in any desired manner.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A method of simulating a bar code for reading by a bar code scanner, with the bar code including a sequence of bars and spaces of varying widths, comprising:

generating a clock signal at a clock frequency and period; and generating independently of said scanner a coded light beam varying sequentially in intensity between minimum and maximum intensity to correspond with said bar code bars and spaces, respectively, and varying sequentially in duration over whole clock periods to correspond with said varying width of said bars and spaces.

2. A method according to claim 1 wherein said coded beam maximum and minimum intensities occur over multiple clock periods, respectively.

3. A method according to claim 2 wherein said bar code scanner is effective for producing a sweeping scan beam, and said coded beam varies sequentially in duration to correspond with duration of said scan beam sweepable across said bars and spaces.

4. A method according to claim 3 wherein said bar code scanner includes a code detector for sensing back-scattered light from said bar code, and said method further comprises projecting said coded beam into said code detector for sensing thereby.

5. A method according to claim 4 wherein said bar code scanner further includes a beam emitter for producing said scan beam across said bar code, and said method further comprises triggering said coded beam upon detection of said scan beam.

6. A method according to claim 4 wherein said bar code is configured for reprogramming said scanner, and said scanner is operable in a reprogramming mode for receiving said coded beam.

7. A method according to claim 4 further comprising varying said clock period multiples to adjust tolerance of said simulated bars and spaces for testing ability of said barcode scanner to read said barcode with varying printing tolerance.

8. An apparatus for simulating a bar code for reading by a bar code scanner, with said bar code including a sequence of bars and spaces of varying width, comprising:

a code emitter for generating a coded light beam; and a controller including an oscillator for generating a clock signal at a clock frequency and period, and operatively joined to said code emitter for varying said coded beam sequentially in intensity between minimum and maximum intensities to correspond with said bar code bars and spaces, respectively, and sequentially in duration over whole clock periods to correspond with said varying width of said bars and spaces.

9. An apparatus according to claim 8 further comprising a memory operatively joined to said controller for initially storing a bar code signature for processing by said controller to flash said code emitter for generating said coded beam corresponding with said signature.

10. An apparatus according to claim 9 wherein said coded beam maximum and minimum intensities occur over multiple clock periods, respectively.

11. An apparatus according to claim 10 wherein:

said bar code scanner is effective for producing a sweeping scan beam; and said controller is configured to vary said coded beam sequentially in duration to correspond with duration of said scan beam sweepable across said bars and spaces.

12. An apparatus according to claim 11 wherein said controller includes a state machine configured for executing said signature in a single one or in a loop of a plurality of runs for correspondingly flashing said code emitter.

13. An apparatus according to claim 12 wherein:

said signature includes a plurality of sequential intervals representing duration of said maximum and minimum alternating intensity of said coded beam emitted from said code emitter;

said memory includes a plurality of addresses each including a respective one of said signature intervals;

said controller includes a count-down circuit; and said state machine executes said signature by sequentially loading said signature intervals from said memory addresses into said count-down circuit, and toggles said code emitter between said maximum and minimum beam intensities each time said count-down circuit reaches zero.

14. An apparatus according to claim 13 further comprising:

a trigger detector disposed adjacent to said code emitter for detecting said scan beam from said scanner; and wherein said controller is operatively joined to said trigger detector for executing said signature upon detection of said scan beam.

15. An apparatus according to claim 14 further comprising:

a plurality of said code emitters operatively joined to said controller for simultaneously flashing said coded beam; and a plurality of said trigger detectors bounding said code emitters for triggering said code emitters upon detection of said scan beam from opposite sides thereof.

16. An apparatus according to claim 15 wherein said code emitters and trigger detectors are colinearly aligned.

17. An apparatus according to claim 15 wherein said code emitters are configured for emitting said coded beam at different wavelengths.

* * * * *